(12) United States Patent
Thibault

(10) Patent No.: US 8,036,802 B2
(45) Date of Patent: Oct. 11, 2011

(54) METHOD OF CONTROLLING A VEHICLE BRAKE WITH COMPENSATION FOR EXPANSION

(75) Inventor: Julien Thibault, Palaiseau (FR)

(73) Assignee: Messier-Bugatti, Velizy Villacoublay (FR)

( * ) Notice: Subject to any disclaimer, the term of this patent is extended or adjusted under 35 U.S.C. 154(b) by 456 days.

(21) Appl. No.: 12/371,198

(22) Filed: Feb. 13, 2009

(65) Prior Publication Data

US 2009/0216417 A1    Aug. 27, 2009

(30) Foreign Application Priority Data

Feb. 27, 2008 (FR) ...................................... 08 01070

(51) Int. Cl.
*B60T 15/14* (2006.01)
*G06F 19/00* (2006.01)
(52) U.S. Cl. ............... 701/70; 701/78; 701/83; 303/20
(58) Field of Classification Search .................. 701/70, 701/72, 75, 78, 83; 303/20, 155, 11; 188/158; 180/65.23

See application file for complete search history.

(56) References Cited

U.S. PATENT DOCUMENTS

| 6,662,906 | B1 |  | 12/2003 | Böhm et al. |  |
| 7,237,634 | B2 | * | 7/2007 | Severinsky et al. | 180/65.23 |
| 2001/0030462 | A1 |  | 10/2001 | Disser |  |
| 2005/0065693 | A1 | * | 3/2005 | Wang et al. | 701/70 |
| 2005/0067233 | A1 | * | 3/2005 | Nilsson et al. | 188/158 |

FOREIGN PATENT DOCUMENTS

| EP | 1 186 495 A1 | 3/2002 |
| EP | 1 695 887 A1 | 8/2006 |
| EP | 1 759 989 A1 | 3/2007 |

* cited by examiner

*Primary Examiner* — Tan Q Nguyen
(74) *Attorney, Agent, or Firm* — Sughrue Mion, PLLC

(57) ABSTRACT

The invention relates to a method of controlling an electromechanical brake for a vehicle wheel, the brake including an actuator provided with a pusher that is actuated by an electric motor and that is adapted to exert a braking force selectively on friction elements in response to an actuation setpoint, the method comprising the following steps:

from a braking setpoint (F), determining a nominal position setpoint ($\overline{X}$) for the brake actuator;

from said braking setpoint (F), estimating a reference current ($i^*$) that ought normally to be flowing in the motor of the actuator to apply a force equal to the braking setpoint;

comparing the reference current ($i^*$) with a current (i) actually flowing in the motor of the actuator, and deducing a position correction ($x_{corr}$); and adding the position correction to the nominal position setpoint.

7 Claims, 1 Drawing Sheet

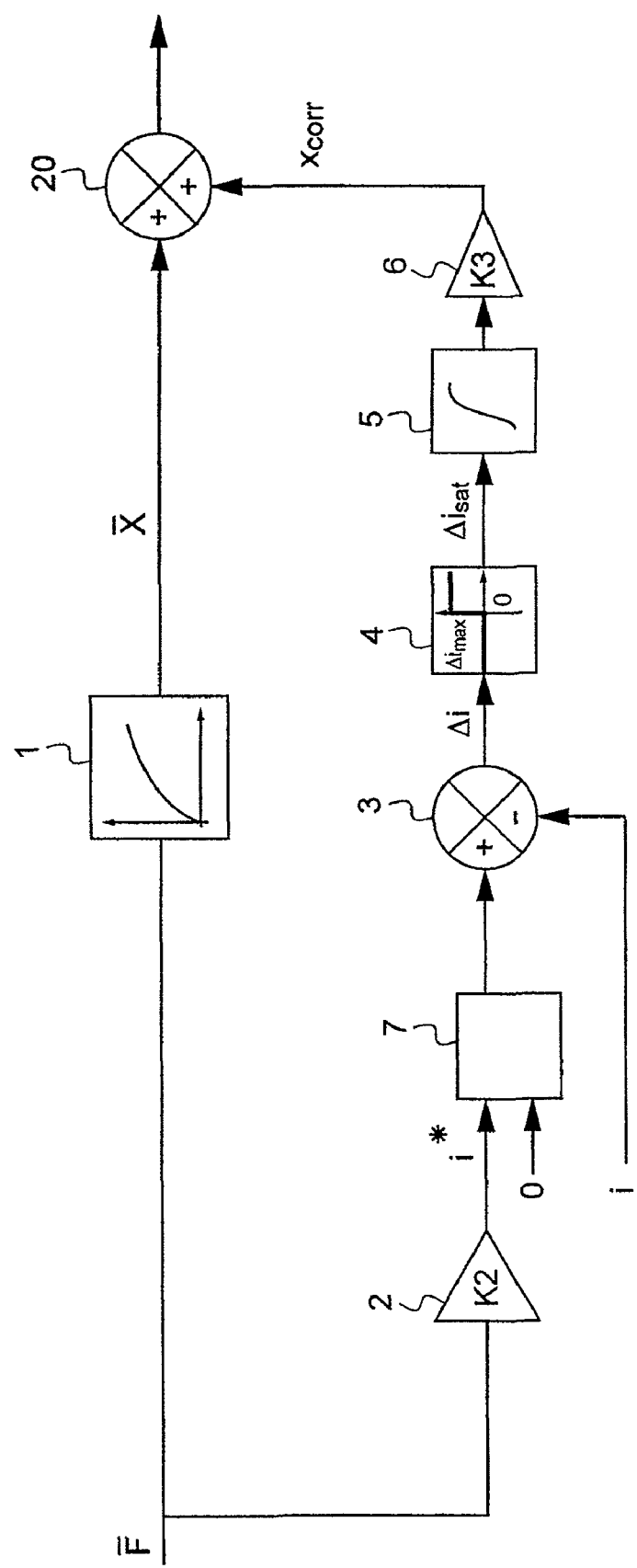

METHOD OF CONTROLLING A VEHICLE BRAKE WITH COMPENSATION FOR EXPANSION

The invention relates to a method of controlling a vehicle brake with compensate for expansion.

BACKGROUND OF THE INVENTION

The braking systems for vehicle wheels comprise braking actuators (which may be hydraulic or mechanical) for applying a force on friction elements for the purpose of generating a braking torque tending to slow the vehicle down.

Most braking control systems known in aviation make use of a setpoint that is converted either into a pressure for hydraulic brakes, or, for brakes having electromechanical actuators, into a force to be applied by the pusher or into a movement to be performed by the pusher.

With electromechanical brakes, controlling actuators in position raises a particular problem associated with possible expansion of the components of the brake during braking. During high-intensity braking, e.g. braking a fully loaded airplane after aborting takeoff, the heat given off by the friction elements of the brake is very large and runs the risk of causing the torsion tube on which the friction elements are mounted to expand, which can have the effect that of reducing the level of force that is exerted for a given position of the pusher of the actuator.

In particular, when using a brake with carbon friction elements, the expansion of the friction elements themselves is very small compared with the expansion of the metal torsion tube on which the friction elements are placed, which can lead, in the event of a very large amount of heat being given off, to a drop in the braking force for a given position of the pushers of the actuators.

OBJECT OF THE INVENTION

An object of the invention is to control a brake in position in a manner that serves to attenuate the potential effects of expansion.

BRIEF DESCRIPTION OF THE INVENTION

In order to perform the invention, there is provided a method of controlling a vehicle brake adapted to exert a braking force in response to a force setpoint, the brake including at least one electromechanical braking actuator having an electric motor actuating a pusher that is movable in register with friction elements, the method comprising the following steps:

estimating a nominal position setpoint for the pusher on the basis of the force setpoint; and in parallel:

estimating a reference current that would flow in the electric motor in a given reference situation in order to exert a force equal to the force setpoint;

comparing the reference current with the current actually flowing in the motor, and if the current flowing in the motor is less than the reference current, deducing a position correction from said comparison; and adding the position correction to the nominal position setpoint.

Thus, if the current flowing in the motor is less than the reference current, that means that although the pusher has been taken to a position corresponding to the nominal position setpoint, the pusher is exerting a smaller force than the force it is supposed to be applying. This can happen if expansion has lengthened the torsion tube such that the model used for deducing the nominal position setpoint from the force setpoint is no longer representative. Under such circumstances, a position correction is determined that is added to the nominal position setpoint for the purpose of increasing the force actually applied by the pusher on the friction elements.

BRIEF DESCRIPTION OF THE DRAWING

The invention can be better understood in the light of the following description with reference to the sole FIGURE constituting a block diagram of a particular implementation of the method of the invention.

DETAILED DESCRIPTION OF THE INVENTION

The invention is described below in application to an aircraft brake of the type having electromechanical actuators controlled in movement. A computer (not shown) generates a braking setpoint $\overline{F}$. This setpoint is corrected at high frequency by an anti-lock protection system that, continuously verifies the slip rate of the wheel to detect any start of wheel locking and consequently to decrease the braking setpoint $\overline{F}$ to avoid the wheel locking.

In known manner, a converter 1 transforms the braking setpoint $\overline{F}$ into a nominal position setpoint $\overline{X}$ for the pusher of the actuator, here using a non-linear model. The nominal position setpoint $\overline{X}$ is calculated at a high frequency of calculation compatible with the operating speed of the anti-lock protection, such that the nominal position setpoint $\overline{X}$ takes account simultaneously of low frequency components and of high frequency components in the braking setpoint $\overline{F}$.

In the invention, a position correction $x_{corr}$ is calculated that is added by means of a summing circuit 20 to the nominal position setpoint $\overline{X}$ in order to obtain the corrected nominal position setpoint $\overline{X}_{corr} = \overline{X} + x_{corr}$. This position correction $x_{corr}$ is performed at low frequency and takes account of a difference between a current actually flowing in the motor of the actuator and a reference current estimated in the manner described below.

Initially, a reference current i* is estimated that is the current that would flow in the electric motor of the actuator to cause the pusher to apply a force equal to the force setpoint $\overline{F}$ in a given reference situation.

More precisely, it is known that the force exerted by the pusher on the friction element is given by the equation governing the dynamics of motor rotation:

$$F = r \cdot \eta \left\{ K \cdot i - C_s - C_v \cdot \Omega - J \frac{d\Omega}{dt} \right\}$$

Where $\Omega$ is the speed of rotation of the motor, J is the inertia of the actuator as transferred to the shaft of the motor, K is a coefficient of proportionality, i is the current flowing in the motor, $C_s$ is the solid friction torque, $C_v$ is the viscous friction torque coefficient, F is the force exerted by the pusher on the friction elements, r is a ratio whereby the movement in rotation of the motor is transformed into movement in translation of the pusher, and $\eta$ is efficiency of the connection between the motor and the pusher.

In a reference situation in which the actuator is under steady conditions (either stationary, or else at a low constant speed), the acceleration term is small, and the solid friction and viscous friction terms are negligible compared with the forces involved. Furthermore, the efficiency $\eta$ is steady.

When the actuator is in the reference situation, it is therefore possible, with little error, to estimate that the force exerted by the pusher is related to the current flowing in the motor of the actuator by the following relationship:

$$F \approx r \cdot \eta \cdot K \cdot i$$

Thus, if the actuator is in such a reference situation, exerting a force equal to the force setpoint $\overline{F}$ would require a reference current i* given by:

$$i^* = \frac{\overline{F}}{r \cdot \eta \cdot K}$$

to flow in the motor of the actuator.

This reference situation is encountered frequently in practice when the brake is in operation. It corresponds in particular to the pusher applying a force on the disks, providing there is no sudden correction due to the anti-locking protection.

In the diagram of the FIGURE, the reference current i* is calculated by means of a multiplier 2 of gain K2 given by:

$$K2 = \frac{1}{r \cdot \eta \cdot K}$$

The reference current i* is delivered to the positive input of a comparator 3 having its negative input receiving a measurement of the current i that is actually flowing in the electric motor of the actuator.

The output Δi from the comparator 3 is delivered to a saturator circuit 4 that saturates this output between 0 and a maximum saturation value $\Delta i_{max}$ so as to output a calibrated difference $\Delta i_{sat}$. The output is then delivered to an integrator 5 and finally to a multiplier 6 of gain K3 that transforms the output from the integrator 5 into the position correction $x_{corr}$, which correction is added to the nominal position setpoint $\overline{X}$.

Because of the action of the saturator circuit 4, the position correction $x_{corr}$ increases only if the current i flowing in the actuator is less than the reference current i*, i.e. if the force applied is clearly less than that which it ought to be.

In practice, conditions in which such a correction is likely to occur are braking conditions that generate a large amount of heat, leading to the torsion tube of the brake expanding, and thereby giving rise to an undesired decrease in the applied force. This is thus braking of very large intensity. Under such circumstances, and when the pusher is in contact with the disks, it is legitimate to assume that the brake is in the reference situation in which it is easy to estimate the reference current i* that ought to be flowing in the electric motor if the actuator were applying the requested force. If the measured current i is less than the reference current i*, then the non-linear model in use in the converter 1 for calculating the nominal position setpoint $\overline{X}$ from the force setpoint $\overline{F}$ is no longer representative of the state of the brake, as can occur when a large amount of heat is given off, thereby leading to levels of expansion that are difficult to measure or to model. The correction formed by the invention thus serves to compensate for the mismatch between the non-linear model and braking conditions.

According to a particular aspect of the invention, a neutralization member 7 continuously verifies whether the operating conditions of the actuator are indeed compatible with the reference situation for which the calculation of the reference current is representative of a real current flowing in the actuator. If the operating conditions of the actuator are such that the calculation is not representative (e.g. during a stage of sudden acceleration of the pusher due to a correction from the anti-slip protection device), the neutralization member 7 delivers zero output such that the difference Δi is always negative. The saturator 4 thus delivers a calibrated difference $\Delta i_{sat}$ that is zero, so the integrator 5 remains unchanging at its then current value. Thus, the position correction is deactivated for operating conditions of the actuator in which the estimated current i* is not representative of a current flowing in the electric motor of the actuator. In practice, the protection member takes account of operating parameters such as the position and speed of the pusher, and the current i actually flowing in the motor, in order to determine whether or not the actuator is in the reference situation.

Preferably, provision is made for the position correction to be reset to zero, e.g. every time contact is detected between the pusher and the disks as a result of the pusher of the actuator engaging the disks.

The invention is not limited to the above description, and on the contrary it covers any variant coming within the ambit defined by the claims.

In particular, although it is stated that the reference current is determined directly from the braking force setpoint by means of a simple multiplier 2, the current could be determined in more sophisticated manner, e.g. taking into account a value for the efficiency η of the connection that might differ depending on the sign of the speed of rotation of the motor, and in even more sophisticated manner, by using a calibrated model of the following type:

$$i^* = \frac{1}{K} \left\{ \frac{\overline{F}}{r \cdot \eta} + C_s + C_v \cdot \Omega \right\}$$

providing values for $C_s$ and $C_v$ have previously been calibrated. Under such circumstances, the reference situation covers nearly all practical operating situations of the actuator, apart from very sudden accelerations in which the acceleration term can no longer be ignored.

What is claimed is:

1. A method of controlling an electromechanical brake for a vehicle wheel, the brake including an actuator provided with a pusher that is actuated by an electric motor and that is adapted to exert a braking force selectively on friction elements in response to an actuation setpoint, the method comprising the following steps:

from a braking setpoint ($\overline{F}$), determining a nominal position setpoint ($\overline{X}$) for the brake actuator;

from said braking setpoint ($\overline{F}$), estimating a reference current (i*) that ought normally to be flowing in the motor of the actuator to apply a force equal to the braking setpoint;

comparing the reference current (i*) with a current (i) actually flowing in the motor of the actuator, and deducing a position correction ($x_{corr}$); and adding the position correction to the nominal position setpoint ($\overline{X}$).

2. A method according to claim 1, wherein, since the position correction can only increase, the increase takes place only if the current (i) flowing in the motor of the actuator is less than the reference current (i*).

3. A method according to claim 2, wherein the difference between the reference current (i*) and the current (i) flowing in the motor of the actuator is saturated at a maximum value ($\Delta i_{max}$) if the difference exceeds said maximum value.

4. A method according to claim 3, wherein the calibrated difference ($\Delta i_{sat}$) is integrated.

5. A method according to claim 1, wherein the correction is neutralized if it is detected that the actuator is in a situation that makes the calculation of the reference current (i*) not representative of a real current flowing in the motor of the actuator.

6. A method according to claim 5, wherein neutralizing the correction blocks the value of the position correction at its then current value.

7. Apparatus for implementing the method of claim 1, the apparatus comprising:
- an input for receiving a braking setpoint ($\overline{F}$);
- an input for receiving a measurement of the current (i) flowing in the motor of the actuator;
- calculation means responsive to the braking setpoint ($\overline{F}$) to calculate a nominal position setpoint ($\overline{X}$) for the pusher of the actuator;
- calculation means responsive to the braking setpoint ($\overline{F}$) and to the current (i) flowing in the motor of the actuator to calculate a position correction ($x_{corr}$); and
- an output delivering the sum of the nominal actuation setpoint plus the position correction.

* * * * *